United States Patent [19]

Gilmer et al.

[11] Patent Number: 5,296,521

[45] Date of Patent: Mar. 22, 1994

[54] FAST-CRYSTALLIZING POLYESTER COMPOSITIONS

[75] Inventors: John W. Gilmer, West Windsor, N.J.; Gianluigi Landoni, Milanese, Italy

[73] Assignees: Istituto Guido Donegani S.P.A., Milan; Enichem Synthesis S.P.A., Palermo, both of Italy

[21] Appl. No.: 71,361

[22] Filed: Jun. 3, 1993

Related U.S. Application Data

[63] Continuation of Ser. No. 766,210, Sep. 27, 1991, abandoned.

[51] Int. Cl.$^5$ .............................. C08K 5/5317
[52] U.S. Cl. ........................... 524/135; 524/126
[58] Field of Search ............... 524/126, 133, 135, 140, 524/141

[56] References Cited

U.S. PATENT DOCUMENTS

| | | | |
|---|---|---|---|
| 3,594,347 | 7/1971 | Lazarus et al. | 524/135 |
| 3,637,898 | 1/1972 | Herwig et al. | 524/133 |
| 3,900,444 | 8/1975 | Racky et al. | 524/126 |
| 4,078,016 | 3/1978 | Kramer | 524/126 |
| 4,180,495 | 12/1979 | Sandler | 524/133 |
| 4,517,355 | 5/1985 | Mercati et al. | 528/287 |
| 4,812,502 | 3/1989 | Cipriani et al. | 524/126 |
| 4,981,945 | 1/1991 | Landoni et al. | 524/126 |

FOREIGN PATENT DOCUMENTS 0021648 7/1981 European Pat. Off. .

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

The present invention relates to fast-crystallizing polyester compositions comprising: (a) a thermoplastic polyester resin; (b) a nucleating agent of the formula:

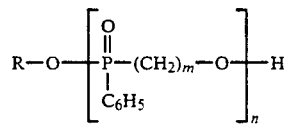

wherein:

R is an alkali or alkaline-earth metal; m is 1, 2 or 3; n takes an average value within the range of 1 to 5; said nucleating agent being optionally admixed with the compound of formula (I) wherein R is a hydrogen atom, linear alkyl radial or branched alkyl radical each having from 1 to 6 carbon atoms; with the proviso that at least 50% mole of said nucleating agent is in the salt form. This nucleating additive raises the crystallization temperature upon cooling ($T_{cc}$) of the polyester so that crystallization occurs rapidly during molding.

13 Claims, No Drawings

FAST-CRYSTALLIZING POLYESTER COMPOSITIONS

This application is a continuation of application Ser. No. 07/766,210, filed on Sept. 27, 1991, now abandoned.

BACKGROUND OF THE INVENTION

1. Field of the Invention

The present invention relates to fast-crystallizing polyester compositions comprising a linear aromatic polyester and a nucleating agent which is highly flame retardant.

2. Discussion of the Background

Polyethylene terephthalate (PET) is used in large amounts, particularly in the field of films and fibers, while its commercial development as a material for injection-molding has slackened off due to the long cycle times necessary to obtain dimensionally stable articles. The PET compositions utilized for injection-molding do not reach a high degree of crystallization, the molding times being equal, in comparison with other plastic materials. This is due to the fact that PET has a slower crystallization rate compared with other crystalline polymers and, therefore, it does not crystallize sufficiently in a mold at the low temperatures from 50° to 95° C. that are usually used for injection molding. Thus satisfactory molding products cannot be obtained, mainly because of changes in the volume of the article itself after molding.

However, it is known that the rate of crystallization of PET can be increased, which means that the crystallization temperature in the melt can be raised, by incorporating proper nucleating agents into the PET molding compositions. Many nucleating agents for the PET crystallization are well known in the art. For example, European Patent Application No. 31,201 describes the preparation of PET by reaction of terephthalic acid and ethylene glycol in the presence of sodium hydroxide, with in situ formation of the nucleating agent.

European Patent Application No. 21,648 describes the reaction of PET with a nucleating agent selected from ionizable metal salts of an organic compound having at least one acid proton. A useful class of aromatic organic acids are those of the formula R—(X)$_n$—(A)$_m$ where A is an acid group selected from the carboxylic, sulphinic, phosphonic, phosphinic and phenol groups, m is an integer which is at least one, X is a direct link or is a —CH=CH— or a —CH$_2$— group, n is an integer between 1 and 4 and R is an aromatic structure consisting of single, fused or multiple aromatic rings. The preferred acid group is the carboxylic group. Preferred examples of such salts are the sodium salts of substituted benzoic acids which contain at least one nitro, halogen, hydroxyl, phenyl or oxyphenyl substituent. The phosphinic derivative is similar to compounds of the present invention but the prior art compounds have inferior flame retardant properties, especially in the absence of a halogen substituent.

European Patent Application No. 25,573 describes the nucleation of PET with a polyoxyalkylene containing at least one carboxylate group.

U.S. Pat. No. 3,761,450 describes lithium and/or sodium salts of aliphatic, cycloaliphatic, aromatic carboxylic acids, or heterocyclic polycarboxylic acids, containing up to 20 carbon atoms, as nucleating agents for PET.

British Pat. No. 2,013,014 describes sodium and potassium salts of selected organic polymers, containing pendent carboxylic groups, as agents capable of increasing the crystallization rate of PET in the composite materials.

U.S. Pat. No. 3,516,957 describes, as nucleating agents for PET, salts of alkali and alkaline-earth metals of organic acids having from 10 to 25 carbon atoms, such as sodium stearate.

Japanese Patent Publication No. 46/29977 describes sodium benzoate as a nucleating agent for PET.

U.S. Pat. No. 4,212,791 describes compositions comprising PET, an inert inorganic nucleating agent, an oligomer polyester crystallization promoter that does not contain carboxylates, and a copolyester-ether thermoplastic segmented elastomer.

European Patent Application No. 102,768 describes a method of nucleating PET by using a nucleating agent comprising an alkaline salt of a polyethylene terephtalate oligomer. The nucleating agent is first separately formed and then brought into contact with the PET to be nucleated.

Japanese Patent Publication No. 61/157556 describes an alkali metal salt of salicylic acid as a nucleating agent for PET and in Japanese Patent Publication No. 56/57825 is disclosed an alkali metal salt of phenol sulfonic acid as nucleating agent for PET.

However, in practice, nucleating agents which cause an appreciable increase in crystallization rates lead to undesirable molecular weight reductions; while the nucleating agents which do not lead to detrimental effects in this regard have little effect on the behavior of PET during crystallization.

U.S. Pat. No. 4,425,470 discloses attempts at nucleating PET without leading to drastic variations of the molecular weight, however, in this case the results are also not completely satisfactory.

European Patent Application No. 351,732 describes compositions comprising PET and an additive to improve its crystallization rate and moldability with less reduction in molecular weight and hydrolysis resistance. The additive is a metal salt of substituted phenols having at least one aromatic ring, at least one hydroxyl group bonded to the aromatic ring and at least one non-ionic substituent group bonded to the aromatic ring, in which the hydroxyl group is in the form of a metal salt.

U.S. Pat. No. 4,886,847 describes, as nucleating agents for PET, alkali or alkaline-earth salts of aryl- or cycloalkyl glycoxylic acids or derivatives thereof.

It is also known, from the U.S. Pat. No. 4,812,502, a flame-retarding additive for PET obtained by means of the oligomerization of a hydroxyalkylenephenylphosphinic acid or of a related alkyl ester thereof. The aforesaid additive imparts linear polyesters with self-extinguishing characteristics.

It has now been found that the above drawbacks can be overcome by using, as nucleating agents, compounds of formula (I) as described hereunder, containing phosphoric groups partly or wholly salified with alkali or alkaline-earth metals.

SUMMARY OF THE INVENTION

The present invention provides fast-crystallizing polyester compositions comprising: (a) a thermoplastic polyester resin; (b) a nucleating agent of the formula:

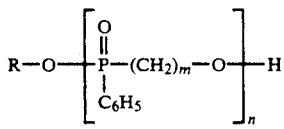

wherein:

R is an alkali or alkaline-earth metal; m is 1, 2 or 3; n takes an average value within the range of 1 to 5; said nucleating agent being optionally admixed with the acid form corresponding to formula (I), in which R is a hydrogen atom, and/or with the ester terminated form corresponding to formula (I), in which R is a linear or branched alkyl radical having from 1 to 6 carbon atoms, with the proviso that at least 50 mole % of said nucleating agent is in the salt form. This nucleating additive raises the crystallization temperature upon cooling ($T_{CC}$) of the polyester so that crystallization occurs rapidly during molding.

DETAILED DESCRIPTION OF THE PREFERRED EMBODIMENTS

The thermoplastic polyester resins employable in the compositions of the present invention are, in general, condensation products of glycols and dicarboxylic acids, or reactive derivatives thereof. Preferably, they will comprise condensation products of aromatic dicarboxylic acids having 8 to 14 carbon atoms and at least one aliphatic glycol having from 2 to 10 carbon atoms.

Suitable aromatic dicarboxylic acids are: terephthalic acid; isophthalic acid; 1,5-, 2,6- and 2,7-naphthalenedicarboxylic acids; 4,4'-diphenylenedicarboxylic acid; 1,4-tetramethylene bis(p-oxybenzoic) acid; and the like. Examples of aliphatic glycols are: ethylene glycol; 1,3-propylene glycol; 1,4-butylene glycol; 1,6-hexamethylene glycol; 2,2-dimethyl-propan-1,3-diol; and the like.

Other polyesters suitable for the present invention are those in which up to 20% mole of the aromatic dicarboxylic acid is replaced by an aliphatic dicarboxylic acid having from 2 to 12 carbon atoms, such as 1,4-cyclohexanedicarboxylic acid; adipic acid; sebacic acid; azelaic acid; and dodecanedioic acid.

The most common thermoplastic polyester resins employable in the compositions of the present invention are based on polyethylene terephthalate, polybutylene terephthalate, polyethylene terephthalate/polybutylene terephthalate copolymers, polyethylene terephthalate/polybutylene terephthalate mixtures. Particularly preferred is polyethylene terephthalate.

In general the thermoplastic polyester resins suitable for the present invention have an intrinsic viscosity ($\eta$) higher than 0.2, preferably higher than 0.4, and typically between 0.5 and 0.7.

Compounds corresponding to formula (I), where R is a hydrogen atom or an alkyl, are known from U.S. Pat. Nos. 4,517,355, 4,812,502 and 4,981,945 as flame retardant agents. The nucleating agents according to the present invention are prepared from these compounds by partial or complete salification by treatment with alkaline or alkaline-earth bases in anhydrous organic solvent.

To form the salt, the flame retardant agent is initially dissolved into anhydrous ethanol or methanol. An equivalent number of moles of the alkali metal ethoxide or methoxide is then added to the solution in the form of a standard solution in alcohol. Excess alcohol is then removed by rotary evaporation with subsequent drying in a vacuum oven. The nucleating agent of the above formula (I) is preferably in the form of an alkali metal salt, more preferably in the form of the sodium salt.

According to the present invention, the nucleating agent may be added to the polyester resin directly or by means of a "master-batch". The "master-batch" or "mother-blend" can be obtained by conventional compounding techniques by adding the nucleating agent, in concentrations between about 5 and about 25% by weight, and preferably between about 10 and about 20% by weight, to the polyester resin. This blend, containing large amounts of nucleating agent, is then added to the polyester resin in the molten state, in an amount generally between 1 and 30% by weight, preferably between about 2 and about 20% by weight, with respect to the starting resin.

The molecular weight and viscosity of the master-batch are controlled by the amount of alkali or alkaline earth metal which one wishes to introduce, and varies in inverse ratio to its concentration. Generally, however, the master-batch has an inherent viscosity, measured in the 1,1,2,2-tetrachloroethane:phenol (60:40 v:v) solvent mixture at 25° C., of higher than 35 dl/g and a number average molecular weight ($\overline{M}_n$) higher than 5000.

The master-batch technique is particularly preferred because it results in good nucleating rates without a significant decrease in the molecular weight, and therefore the viscosity, of the polyester resin.

When the nucleating agent is directly added, it is admixed with the thermoplastic polyester resin in the molten state in amounts ranging from about 0.1 to about 10% by weight, preferably from about 0.5 to about 5% by weight, with respect to the resin. Direct addition is particularly useful when high crystallization rates but low nucleating agent concentration are required.

The alkali or alkaline-earth metal content in the final polyester composition can be varied as a function of the crystallization temperature to be reached. As the proportion of salt form is increased the crystallization temperature (Tcc) increases.

By varying the amount of nucleation agent added, the alkali or alkaline-earth metal content in the final polyester composition can be varied. The proper amount of nucleating agent is necessary so that enough metal is present in the polyester to initiate crystallization at a sufficiently high temperature when the polyester melt is being cooled during processing, but not such a high concentration of metal that it results in an excessive decrease in the polyester molecular weight.

The fast-crystallizing polyester compositions according to the present invention may also contain a mobility enhancer, which allows the crystallization of the polyester to continue when the melt has reached the temperature of the mold. Inert and reinforced fillers, such as chopped glass fibers, carbon fibers or boron fibers, particulate glass, mica, zeolites, graphite and talc may be also incorporated.

Moreover, the compositions of the present invention may contain the usual additives and/or auxiliary substances to improve the characteristics of heat stability, oxidative stability and light stability, and other additives such as pigments, dyestuffs, colorants, flame-retardant agents, mold release agents, impact modifiers, as well as small amounts of other types of thermoplastic resins or small amounts of rubbery compositions to confer good impact properties.

The fast-crystallization polyester compositions of the present invention are characterized by high crystallization temperatures, high crystallization rates, a homogeneous distribution and a low concentration of the nucleating agent. They may be used for producing large numbers of articles by injection- or extrusion-molding techniques and particularly auto car components, electric components, etc. They may also be used in the form of fibers, films, sheets, etc.

For a still better understanding of the present invention and for putting it into practice, a few illustrative examples are given hereunder, which are not to be construed as a limitation on the scope of the invention.

EXAMPLE 1

Hydroxymethylphenyl phosphinic acid (AHPP) was prepared according to the method described in the U.S. Pat. No. 4,517,355. To obtain the sodium salt, the AHPP was dissolved in anhydrous ethanol and, after potentiometric nonaqueous titration, the correct stoichiometric equivalent of $NaOCH_2CH_3$ was added. The slurry of AHPP and $NaOCH_2CH_3$ was then refluxed until the salt formation was complete. The product was then separated by filtration and vacuum drying.

EXAMPLE 2

Oligomethylene phenyl phospinic acid (OMPP) was prepared according to the method described in the U.S. Pat. No. 4,812,502. To obtain the sodium salt, the OMPP was dissolved in anhydrous ethanol and, after potentiometric non-aqueous titration, the correct stoichiometric equivalent of $NaOCH_2CH_3$ was added. The OMPP sodium salt was then recovered by vacuum removal of the solvent.

EXAMPLE 3

For each compound obtained according to Examples 1 and 2, a composition with PET was prepared by mixing the nucleating agent, in a Haake mixing bowl for 5 minutes at 280° C., with PET fiber grade (crystallization temperature of approximately 188° C. (+/−2° C.), intrinsic viscosity 0.62). The concentration of the nucleating agent was 0.5% by weight for each sample.

The effectiveness of the nucleating agent was evaluated on the basis of the temperature of the crystallization peak of the PET/nucleating agent composition. The crystallization temperature from the melt was measured, by means of a differential scanning calorimeter with a cooling rate of 20° C./minute, by reading the temperature corresponding to the crystallization onset and to the maximum rate of crystallization.

To evaluate to what extent the molecular weight of the PET had dropped as a result of processing, the melt index of the PET/nucleating agent composition was measured according to ASTM D1238. Moreover, the intrinsic viscosity ($\eta$) was determined in a 60:40 volume percent mixture of 1,1,2,2-tetrachloroethane and phenol at 25° C. The average viscosity molecular weight $\overline{MW}_v$ was calculated using the Mark-Houwink Equation $[\eta] = K \cdot (\overline{MW}_v)^a$, where K=0.0016 and a=0.64.

The results obtained are summarized in the following Table:

TABLE I

| EX. | MELT INDEX | INTRINSIC VISCOSITY | CRYSTALLIZATION TEMP. (°C.) | |
|---|---|---|---|---|
| | | | Onset | Maximum |
| 1 | 197 | 0.45 | 214 | 207 |
| 2 | 247 | 0.47 | 214 | 208 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for accelerating polyester crystallization comprising the steps:

mixing a thermoplastic polyester resin and an effective amount of a nucleating agent of the formula:

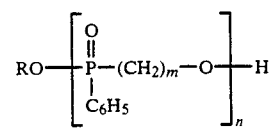

wherein:

R is an alkali or alkaline-earth metal; m is 1, 2 or 3; n takes an average value within the range of 2 to 5; said nucleating agent being optionally admixed with the compound of formula (I) wherein R is a hydrogen atom, linear alkyl radical or branched alkyl radical having from 1 to 6 carbon atoms; with the proviso that at least 50 mole % of said nucleating agent is in the salt form.

2. The method according to claim 1, wherein R is an alkali metal.

3. The metal according to claim 2, wherein R is sodium.

4. The method according to claim 1, wherein the thermoplastic polyester resin is polyethylene terephthalate.

5. The method according to claim 1, wherein the nucleating agent is directly added to the thermoplastic polyester resin in amounts between about 0.1% and about 10% by weight with respect to the resin.

6. The method according to claim 5, wherein the nucleating agent is directly added to the thermoplastic polyester resin in amounts between about 0.5% and about 5% by weight with respect to the resin.

7. The method according to claim 1, wherein the nucleating agent is added to the thermoplastic polyester resin in the form of a master-batch which is separately prepared.

8. The method according to claim 7, wherein the master-batch has an intrinsic viscosity higher than 0.2, measured in a 1,1,2,2-tetrachloroethane:phenol (60:40 v:v) solvent mixture at 25° C., and a number average molecular weight higher than 5000.

9. The method according to claim 7, wherein the master-batch contains from about 5 to about 25% by weight of the nucleating agent of formula (I).

10. The method according to claim 9, wherein the master-batch contains from about 10 to about 20% by weight of the nucleating agent of formula (I).

11. The method according to claim 7, wherein the master-batch is added to the thermoplastic polyester resin in the molten state, in an amount between about 1 and about 30% by weight with respect to the starting resin.

12. The method according to claim 11, wherein the master-batch is added to the thermoplastic polyester resin in the molten state, in an amount between about 2 and about 20% by weight with respect to the starting resin.

13. The method according to claim 1, containing at least one additive selected from the group consisting of mobility enhancers, heat stabilizers, oxidation stabilizers, light stabilizers, pigments, dyestuffs, colorants, flame-retardant agents, mold release agents, impact modifiers, thermoplastic resins, rubber materials, or mixtures thereof; and optionally containing a reinforcing filler selected from the group consisting of chopped glass fibers, carbon fibers, boron fibers, particulate glass, mica zeolites, graphite and talc; or mixtures thereof.

* * * * *